June 3, 1947. J. W. AYERS Re. 22,886

MANUFACTURE OF AMORPHOUS CARBON

Original Filed June 28, 1938 5 Sheets-Sheet 1

INVENTOR
JOSEPH W. AYERS
BY Hammond & Littell
ATTORNEYS

June 3, 1947. J. W. AYERS Re. 22,886

MANUFACTURE OF AMORPHOUS CARBON

Original Filed June 28, 1938 5 Sheets-Sheet 2

INVENTOR
JOSEPH W. AYERS
BY
Hammond & Littell
ATTORNEYS

June 3, 1947. J. W. AYERS Re. 22,886

MANUFACTURE OF AMORPHOUS CARBON

Original Filed June 28, 1938 5 Sheets-Sheet 3

INVENTOR
JOSEPH W. AYERS
BY
ATTORNEYS

MANUFACTURE OF AMORPHOUS CARBON

Original Filed June 28, 1938 5 Sheets-Sheet 4

INVENTOR
JOSEPH W. AYERS
BY
Hammond & Littell
ATTORNEYS

June 3, 1947. J. W. AYERS Re. 22,886

MANUFACTURE OF AMORPHOUS CARBON

Original Filed June 28, 1938 5 Sheets-Sheet 5

INVENTOR
JOSEPH W. AYERS
BY
Harrison & Hill
ATTORNEYS

Reissued June 3, 1947

Re. 22,886

UNITED STATES PATENT OFFICE 22,886

MANUFACTURE OF AMORPHOUS CARBON

Joseph W. Ayers, Easton, Pa., assignor, by direct and mesne assignments, to Phillips Petroleum Company, Bartlesville, Okla., a corporation of Delaware Original No. 2,292,355, dated August 11, 1942, Serial No. 216,391, June 28, 1938. Application for reissue August 3, 1943, Serial No. 497,256

34 Claims. (Cl. 23—209.8)

REISSUED
JUN 3 1947

This invention relates to the production of finely divided amorphous carbon pigments of the type usually referred to as carbon blacks, lampblack, and the like.

Large quantities of amorphous carbon, or carbon black, are now used as pigments in paints, varnishes, inks and the like, as fillers for rubber compositions, in phonograph records, carbon papers, etc. Carbon black in general is classified in the art either as carbon black or lampblack, depending upon whether produced from gaseous or liquid hydrocarbons. Almost the entire demand of the rubber industry is filled by so-called "channel" black, a carbon black obtained by impingement of a natural gas flame against a cooler metal surface, because of its low cost, its strengthening powers and wear resistance in rubber. Channel black predominates, but to a lesser extent, in industries where blacks are used as color pigments; for such purposes, however, other types of carbon blacks and lampblacks may be preferred due to special qualities, such as color tone, oil absorption, tinting strength, etc., which affect the appearance or manufacture of the pigmented product.

The use of prior known types of lampblack is limited to special fields by their physical qualities. Even in fields where they are capable of competing with channel black on a quality basis, the market for lampblack of the kind heretofore available is restricted by the greater cost of lampblacks due to the more expensive raw materials and the uneconomical process employed for their production. The usual process of producing lampblack is known as the German process, in which by-product liquid hydrocarbons, such as distillates of petroleum, tar, vegetable oil and the like, are burned from wicks or pans in a furnace under conditions of incomplete combustion. The resulting carbon is carried with combustion gases through an updraft flue and thence into baffled brick settling chambers where the carbon particles deposit. To recover the lampblack, production is stopped and the chambers allowed to cool. Workmen then enter and drag the black by scrapers into a packing room.

The economy of this German process is seriously affected by the cost of the raw material and by the extensive apparatus required for adequate capacities, since the quality of the product is best when a small furnace is used and decreases with increases in the size of the furnace. Yields of black are low, and the process is relatively costly to operate. Of greater importance, slight variations in combustion conditions have pronounced effects upon quality, and since accurate control is difficult to maintain, it is almost impossible continuously to obtain high grade lampblack from the settling chambers.

On the other hand, the conventional channel process, while including many objectionable features with respect to collection of the product and necessity for accurate control over the setting of the burners, does not materially vary with respect to the quality of the product as the size of the equipment is increased. Wherever excess supplies of natural gas are available, carbon black produced by this process is inexpensive. The production of carbon black is usually carried on as an incident to other operations, using gas which otherwise might be wasted into the air. The serious disadvantages of the channel process, however, are the unpredictable changes in product quality which accompany changing weather conditions, the need for large supplies of natural gas, the very low yields of carbon obtained from the gas, usually approximating three to five (3 to 5%) percent, and the consequent waste of a valuable natural resource which occurs during its operation even though no immediate market for the gas is at hand.

The need for an economical process of producing black of good quality from liquid hydrocarbons has existed for a long time. Any such process is of value which will yield a black capable of competing with channel black in price and also possessing pigment qualities equal to or better than those of channel black. To do this it is important that the process be able to employ raw material of little commercial value. A process which can consistently produce black of good quality from such material at low cost and at the same time obtain a high yield of carbon from the raw material not only meets an immediate need in the art, but also provides a practicable substitute by which the wastefulness of the channel black process may be avoided.

I have now provided a process which possesses all of the characteristics mentioned above, together with still others which give added importance to its preferred embodiments. This new process permits the continuous and economical production of high grade black from various types of liquid hydrocarbons of low cost. It provides a complete sequence of treatments leading to the recovery of immediately marketable products. So far as I am aware, it is the first process capable of producing blacks of good quality, at low cost per pound, from crude hydrocarbons that are practically valueless for other purposes. I have successfully used crude petroleum from the Casmalia field of Santa Barbara County, California, as a raw material by taking the oil directly from the well, treating it to remove bottom settlings and water, and introducing it into process without intermediate chemical treatment or distillation. This type of oil is of heavy asphalt base, having an A. P. I. gravity of 9 to 10, a carbon content of about 80%, and about 3% to 5% of gasoline and kerosene. It is characterized for its lack of value for gasoline, fuel or lubricating purposes, and wherever oils of this type are found they are of low cost because they are practically unmarketable excepting as asphalt.

Another special advantage of the process herein described is that yields of valuable black totalling between 25% and 40% of the theoretical carbon content of the raw material may be obtained. Another advantage is that blacks of various selected physical qualities may be obtained by adjustments of the process. Still another advantage, of great importance, is that the process may be used for the production of a new type of lampblack having pigment qualities in many respects superior to those obtainable in any other blacks available on the market.

Further features and advantages which have not been mentioned above will appear from the following description of the process, in which its principal features are described together with details of a preferred embodiment thereof.

An important new feature of my process consists in the continuous combustion of liquid hydrocarbons to produce valuable black pigments therefrom by forcing a stream of the liquid through a spray nozzle under pressures of several thousand pounds per square inch to produce a high degree of atomization and high rate of vaporization, and introducing the resulting spray of minute particles of oil or vapors into a heated refractory reaction zone of a furnace or retort where conditions for partial combustion and cracking of the atomized and vaporized particles are maintained. This high pressure atomization of the oil changes it into extremely minute particles, of almost molecular dimensions, and projects them uniformly and at high velocities into the reaction zone. Shearing action between the projected particles and the furnace atmosphere results in further disintegration. Combustion of part of the spray and cracking of the vaporized remainder occur immediately upon entrance of the spray into the reaction zone. The highly atomized and vaporized particles cracked under the conditions there encountered are reduced to an elemental form of carbon having unusual and valuable qualities for use in paints, varnishes, inks and the like, and in rubber compounding.

Another important new feature of my invention consists in the continuous cracking of hydrocarbons into elemental carbon under superatmospheric pressures. I have provided a process in which hydrocarbon raw material and a regulated stream of air to support partial combustion are continuously introduced into a reaction chamber, reacted therein to produce finely divided amorphous carbon, and the reacted materials then discharged continuously from the reaction zone, yet the reaction chamber is maintained at all times under pressures in excess of atmospheric pressure. This feature results in several advantages. At a given temperature prevailing in the reaction zone the hydrocarbon molecules crack much more readily under superatmospheric pressures than under normal pressures, and an increase in the production yield of black is realized. The maintenance of elevated pressures also increases the density of gases, including air, in the chamber, which accelerates the rate of reaction and promotes the production of a carbon pigment of high quality. As the density of the gases increases the particles of oil projected into the chamber undergo a greater shearing action, resulting in greater atomization. In addition, the travel of the spray into the chamber before reaction occurs and the duration of the reaction may be shortened, which I have found to be an important consideration in producing a black of highest quality.

Still another feature of my process resides in discharging nascent carbon particles from the reaction chamber in an extremely short interval of time and cooling them quickly to a temperature preventing the occurrence of objectionable secondary reactions. In this manner the condition of the carbon is fixed as established in the reaction zone, and a product remarkably free of adsorbed polymerization products and objectionable physical characteristics is obtained. The entire period of time during which the carbon is subject to reactive influences usually approximates one-tenth of a second or less.

A further feature of this process is that the cracking reactions are carried out at extraordinarily high temperatures which may be maintained continuously, without substantial variations, at about 2300 F. or higher. This adds to the efficiency and rapidity of decomposition and results in higher yields of carbon of high pigment quality.

In the practice of my process for the production of black from crude or substantially crude petroleum, oil from which objectionable amounts of base settlings and water, grit and gas have been removed is first treated to increase its fluidity, which facilitates pumping thereof at high pressures and the formation of a highly atomized spray upon passage through the injector of the reaction retort. This treatment may be accomplished in several ways. One is to add a lighter distillate to the oil so as to reduce its viscosity to a suitable point. Another, and the preferred practice because of its greater economy, is to impart greater fluidity to the crude material by heating. In processing a Casmalia crude, for example, heating to temperatures of about 150° to 500° F. permits highly satisfactory operations. It will be understood that no such treatment is necessary when less viscous materials, such as petroleum distillates, are used as the raw material.

After any such preliminary treatment, the liquid hydrocarbon of suitable fluidity is passed in a stream through a pumping system capable of forcing it under a high pressure of several thousand pounds per square inch through the injection nozzles into the retorts. Pressures in excess of two thousand pounds per square inch are used in all instances for best results, but a reduction considerably below this point may be made without departing from the broader principles of the invention, particularly when operating on distillates or high gravity crudes. The essential consideration is to get a high degree of atomization and high rate of vaporization of the material sprayed into the retort. The injecting pressure necessary to do this satisfactorily, at least in the treatment of low gravity crude oil with atomizing equipment now available, will usually exceed 1500 pounds per square inch. From the pumping system the oil under high pressure goes directly to the spray nozzle or injector of the cracking retort for introduction into the reaction chamber. The highly atomized spray from the injector enters the heated refractory reaction zone simultaneously with a stream of air, the direction and angle of the spray and the flow of air being controlled, the latter preferably so as to maintain a spirally moving annular stream of air between the reaction chamber wall and an axial stream of the vaporized hydrocarbon, so that impingement of unreacted hydrocarbon against walls of the reaction chamber is avoided. The zone of reaction is continuously maintained at a high temperature by combustion of part of the vaporized oil. As the spray enters this zone, vaporization and, then, combustion and cracking reactions occur almost instantaneously. Thereupon the reacted materials, including a large proportion of elemental carbon, are continuously and quickly discharged from the reaction chamber through a refractory end wall for the reaction chamber, and the discharged materials are immediately subjected to cooling influences in a cooling zone at the discharge end of the retort.

Superatmospheric pressures are maintained in the reaction chamber during the operation of this process by several contributing factors. The projection of the oil through the spray nozzle under extreme pressures is one factor. The introduction of air for partial combustion is another, which is preferably effected, at least in part, by passing air under pressure through a restricted annular orifice at the entry end of the chamber. Combustion and cracking reactions in the reaction zone multiply the volumes of gases in the chambers. In addition to the above, a supply of inert gaseous fluid is continuously maintained under superatmospheric pressure adjacent the discharge end of the reaction chamber, and this exerts a back pressure and keeps the pressure in the reaction chamber at a minimum of several pounds per square inch above atmospheric pressure. This back pressure is obtained, for example, by forcing steam under pressure into the back, or cooling chamber, of the retort. Another procedure is to spray water thereinto, which immediately vaporizes at the prevailing high temperatures. The steam serves the double purpose of keeping the pressure and activity within the reaction chamber at a proper balance, and it cools the reacted carbon particles immediately upon passing through the perforate checkerwork constituting the end wall of the reaction chamber.

It is important, in operations for the continuous production of high grade black, that the heat generated by combustion in the retort be conserved and distributed within the reaction zone as uniformly as possible. To this end, I have found it desirable to employ a high ratio of heat-radiant surface to volume of gases, enclosing the zone of reaction closely within the refractory walls of the reaction chamber and locating it as close to the perforate end wall thereof as feasible without permitting unreacted oil particles to impinge on said wall.

The perforate end wall of the reaction chamber, usually consisting of a refractory checkerwork, provides free space through which the gases and suspended products from the reaction chamber pass directly into the cooling zone. They are quickly reduced to a non-reactive temperature in the cooling zone and then carried out by the pressure of the system, while still hot, into a precipitator where carbon articles, of microscopic and sub-microscopic size, are flocculated by electrostatic action or separated by filtration, or otherwise, from the waste gases, which waste gases are discharged from the usual stack. From the precipitator, the gases and suspended carbon may be passed through a cyclone or other form of separator which separates the carbon from the gases, and the carbon is collected in a hopper for further cooling. Thereafter, the carbon may be dried while being agitated, passed through a pulverizer and introduced into a storage bin, all in continuous operations. The material in the bin is ready for immediate packing and shipment to market. The temperature of the gases throughout the entire system is maintained above the dew point of the gases to prevent precipitation of moisture.

While I will describe my invention as it is practiced in a single retort, it will be understood that I am describing one embodiment in which the principles of my invention may be carried out, and that a plurality of retorts may be used, or a plurality of atomizing nozzles may project oil and air sprays into a single retort of suitable size and dimensions to give the desired partial combustion of the hydrocarbon material, and that other variations may be resorted to in the operation of the process.

In the accompanying drawings,

Figure 1 illustrates diagrammatically one plan of embodiment of a plant for producing black from crude petroleum in accordance with a preferred embodiment of my invention.

Figure 1*a* is a detail end view of the drier showing inside construction in dotted lines.

Figures 1, 1A:
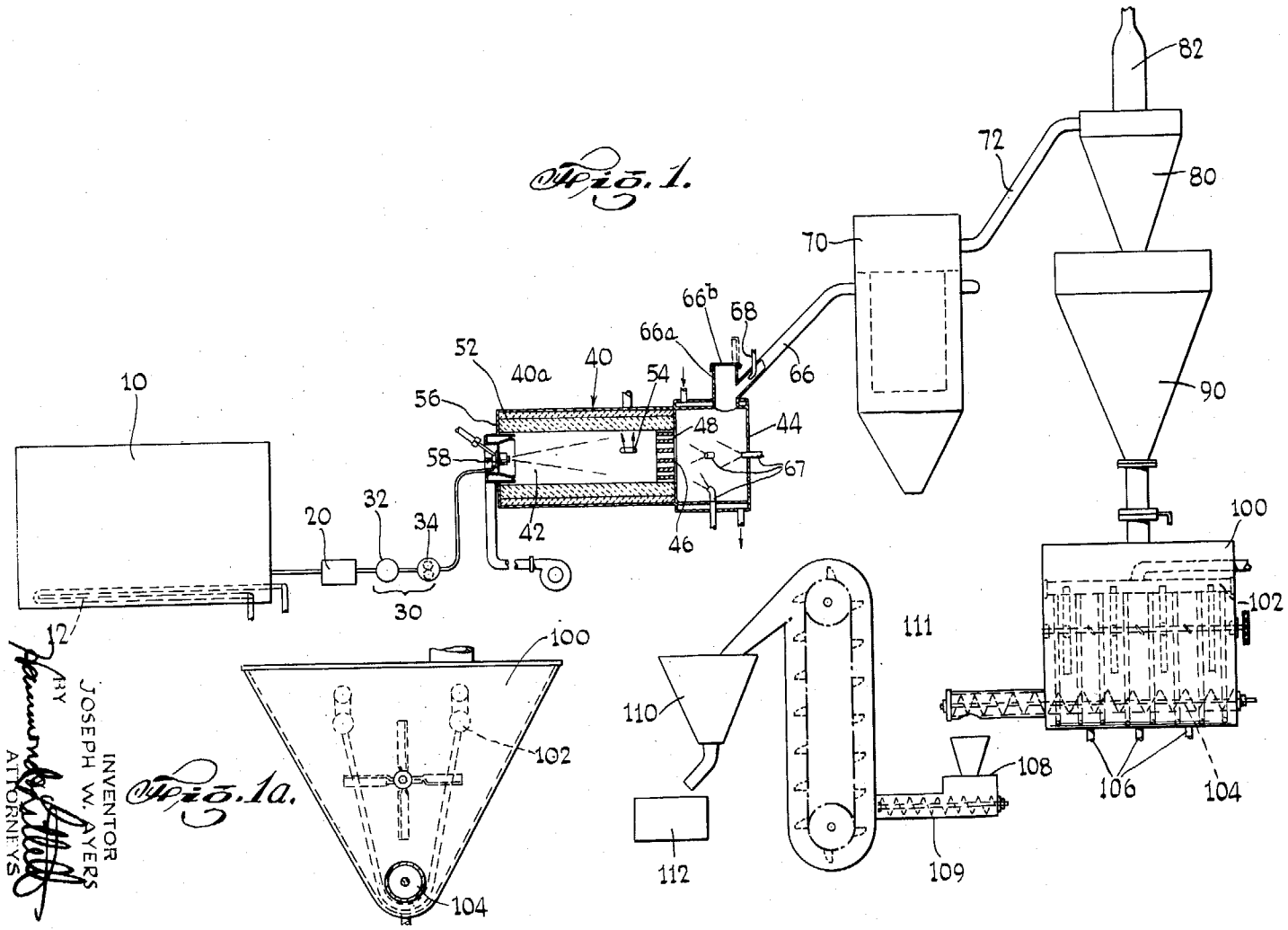

The plant arrangement illustrated in Figure 1 includes, as the principal units of equipment, a storage tank 10 in which a supply of the liquid raw material is kept ready for introduction into process, a preheater 20, pumping system 30, a furnace or retort 40, precipitator or filter 70, cyclone separator 80, cooling hopper 90, drier 100 and storage bin 110. Each of these units may be of various types, or in multiples where necessary. In addition, various other items of equipment may be employed in a complete plant for practicing the invention, some of which are referred to below.

The storage tank 10 may include steam coils 12 therein for raising the temperature of the oil to a point where it will flow by gravity before introducing the same into process. Preheater 20 heats the oil to a selected temperature or range of temperatures, preferably between 150° and 500° F., by the use of combustible gas, electricity, steam or other suitable heating means.

The pumping system 30 in the illustrated embodiment includes a low pressure pump 32, operating at pressures of twenty-five to fifty pounds per square inch, and a high pressure pump 34, for example a Triplex pump, which advances the stream of crude oil to the retort nozzles under pressures of two thousand to six thousand pounds per square inch. Pump 32 feeds a regular stream of oil to the high pressure pump 34.

The stream of oil from pump 34 goes directly to the retort 40, to be described more particularly hereinafter. A continuous stream of gases and suspended fine carbon particles pass from the cooling chamber 44 of the retort 40 through conduit 66 and into precipitator 70, which can be an up- or down-draft precipitator but is preferably a downdraft precipitator of the Cottrell type embodying means for electrostatically flocculating minute particles of carbon in the gases. In lieu of an electrical precipitator, it will be understood that other means for removing or flocculating the fine carbon particles may be used, or that discharging filters of temperature-resistant material, such as glass cloth, may be used.

The gases and suspended carbon, after treatment in the precipitator, pass through a conduit 72 and into the cyclone 80, where carbon is separated from the gases and discharged into hopper 90 and the gases and steam are vented through a flue or stack 82. The entire system, from the retort to and including hopper 90, is maintained under positive pressure and protected against access of air so as to prevent spontaneous combustion of the carbon, which is still quite hot when it reaches the hopper.

Beyond hopper 90 additional apparatus preferably is provided for further treatment of the product. A drying bin 100 is located to receive black from hopper 90. This bin includes heating means 102 and agitating and conveying means 104. Conduits 106 enter the bottom of the bin and accommodate a supply of compressed air, used for drying. Material received in bin 100 from hopper 90 is thoroughly agitated and blown with air, while being heated, to remove steam or entrapped moisture therefrom. The material is kept above the dew point until discharged from the bin 100. A continuous stream of black which has been treated in this manner is fed from the bin 100 by the conveyor means 104. A pulverizer 108 receives dried black from bin 100, and from the pulverizer the material is passed onward by a conveyor 109 and elevator 111 and introduced into the storage bin 110. Here it remains until withdrawn and introduced into packing apparatus 112 for packing into bags for shipment.

While I have illustrated a preferred system and apparatus for handling and recovering the carbon black after its formation in the retort 40, it will be understood that any system and apparatus which will cool and recover the carbon particles may be used in lieu of the specific parts 70, 80, 90 and 100 illustrated.

The retort 40 is preferably composed of an outer metal shell and an inner brickwork forming a refractory reaction chamber 42 and a cooling chamber 44. The two chambers communicate through openings 48 in a perforate refractory end wall, or checkerwork, 46, of firebrick or the like, at the discharge end of the reaction chamber. The entire retort is enclosed within a sheet metal casing 50.

The side walls of chamber 42 are formed of thick brickwork or refractory material 52 which is capable of withstanding temperatures of 3000° to 3500° F. or higher for long periods of time. Auxiliary air inlets may be provided in the walls of the retort by oppositely disposed slotted openings 54 through which part of the air for combustion may be introduced tangentially into the reaction zone of the combustion chamber.

Means are provided at the entry end of the retort for mounting an injector or spray nozzle in axial alignment therewith and for introducing an annular stream of air under pressure into chamber 42. The forward end wall 56 includes a central opening which receives and mounts the spray nozzle 58, to which oil of a suitable fluidity is forced by the high pressure pump 34. Wall 56 also provides an annular header 60 having a feed conduit 62, for air under pressure, entering thereinto tangentially and a restricted annular orifice 64 for directing an annular stream of the air into and along the walls of the reaction chamber. The structure forming orifice 64 may include vanes 64*a* for imparting a spiral, swirling motion to the annular stream of air entering the retort.

The cooling chamber 44 at the discharge end of the retort is left uninsulated, and it preferably is enclosed by a water jacket 65 which assists in cooling the chamber and reducing materials therein to non-reactive temperatures. A discharge conduit 66 leads from the chamber 44 to carry gases and suspended carbon therefrom into the collection system here illustrated as precipitators 70, etc. A plurality of nozzles 67 may be provided in chamber 44, and additional nozzles 68 in conduit 66, for introducing steam thereinto and maintaining the desired back pressure in chamber 44 and the rear end of the reaction chamber 42.

An example of operation of my process, embodying the principal features thereof, is as follows:

A stream of heavy Casmalia crude oil is continuously withdrawn from storage, heated to a temperature between about 150° and 500° F. to impart fluidity, and then pumped to the spray nozzle of the retort under pressures preferably of about 2000 to 6000 pounds per square inch. The stream of liquid hydrocarbon forced through the nozzle under these extreme pressures is converted into a continuously uniform spray composed of very fine particles and oil vapor. Simultaneously, air under pressure, for example, about twelve pounds per square inch or greater, and in an amount regulated to effect the desired incomplete combustion, is pumped into the header 60 at the entry end of the retort and thence through the restricted annular air orifice 64. Part of the desired quantity of air to give partial but incomplete combustion of the hydrocarbons may be passed into the reaction chamber at other points therein, as, for example, the auxiliary air inlets 54.

The air circulation follows the inside wall of the reaction chamber preferably with a spiral motion, while the highly atomized spray of oil is injected into the reaction zone of the chamber in a circular, cone shaped pattern toward the perforate checkerwork at the discharge end of the reaction chamber. During passage through the retort the atomized oil spray mingles uniformly with air and is vaporized and reacted almost instantaneously to crack and partially burn the hydrocarbons to a form of elemental carbon. In operations the reaction zone of the retort remains at a substantially uniform temperature usually not lower than about 2000° F. and preferably about 2300° F., or higher, and the products sweep through the reaction zone at a high rate of speed.

The products of reaction, including gases and suspended carbon particles, continuously pass through the perforate refractory end wall of the reaction chamber and into the cooling chamber, thereby automatically and continuously clearing the retort of carbon and preventing coking or choking of the retorts. The oil remains in contact with reactive influences only about one-tenth of a second or less, during which period the vaporization and cracking or partial combustion of each minute oil particle is completed, and the dry carbon and gases of combustion swept out of the reaction zone and into the cooling chamber. In the cooling chamber they are reduced immediately by steam or other inert gases to a non-reactive temperature, for example, about 1000° F., thereby preventing further reaction or combustion of the carbon particles, and then are discharged through the exhaust conduit into the flocculator or precipitator 70, which may be of the Cottrell type or any other type suitable for gathering the fine particles of carbon from the combustion gases.

The precipitator, by electrostatic action, flocculates particles of the carbon to facilitate separation thereof from the furnace gases. From the precipitator the carbon particles and gases travel into a cyclone or other form of separator 80 and are separated therein, and the carbon collects in the communicating hopper 90 while still at a fairly high temperature, for example, about 600° F., while the combustion gases and steam freed from entrained carbon particles are discharged through the stack 82. Any suitable means to cool and collect the carbon particles formed in the retort 40 may be used.

The collected carbon is allowed to cool in the hopper 90 without access of air until it is below the temperature of spontaneous combustion. The cooled material is then passed through the drier 100, where it is dried by air while heated to a temperature of about 350° F. From the drier it goes through the pulverizer 108 and then is stored until packed for shipment. A yield of from one and one-half to three pounds of black per gallon of oil is obtained.

Figure 13:
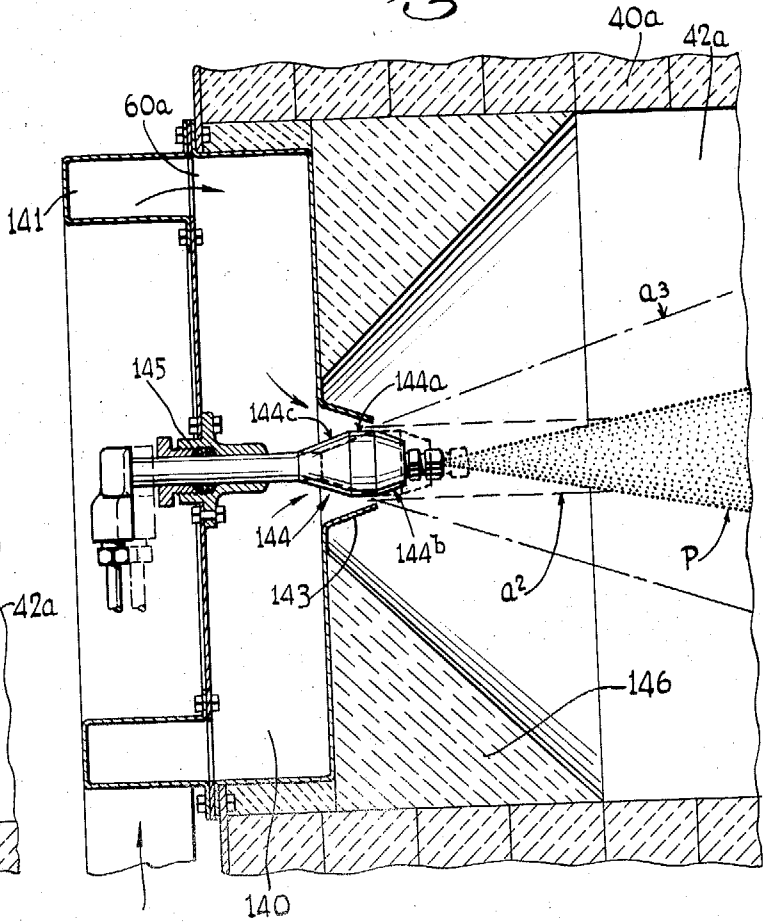
Figure 13 is a view similar to Figure 12 showing the oil injector nozzle in a different position of adjustment.
Figure 12:
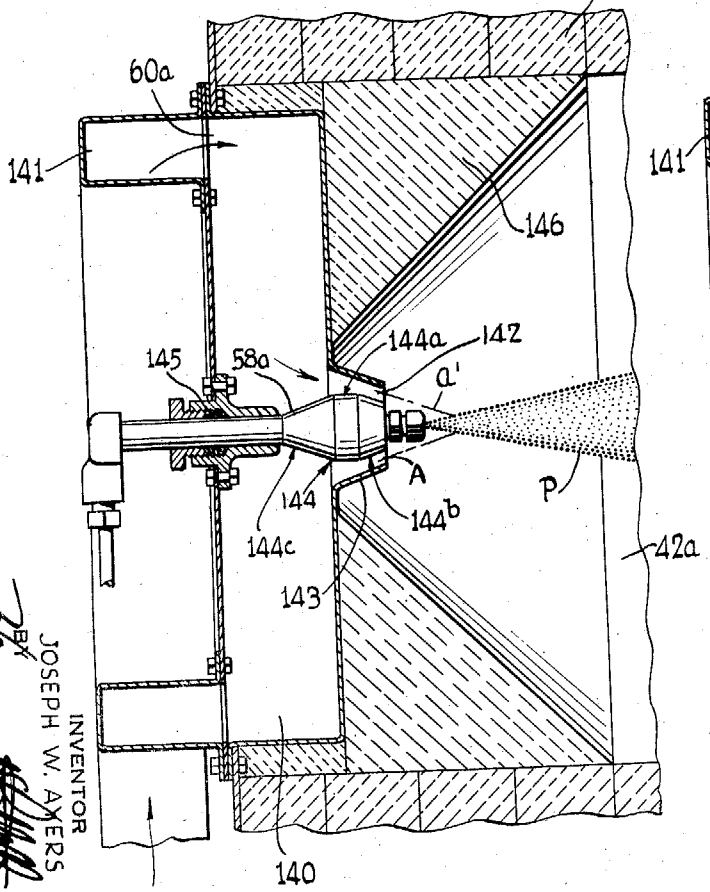
Figure 12 is a detail view showing a modified form of air header construction and adjustable oil injector nozzle which permits the oil spray pattern and air distribution to be controlled by adjustment of the injector nozzle.

In order to give more accurate control over the combustion conditions in the retort and to control and vary the quality of carbon produced by the process, means to adjust the position of the oil injector nozzle and air pattern may be provided as indicated in Figures 12 and 13.

Figures 2, 3, 4:
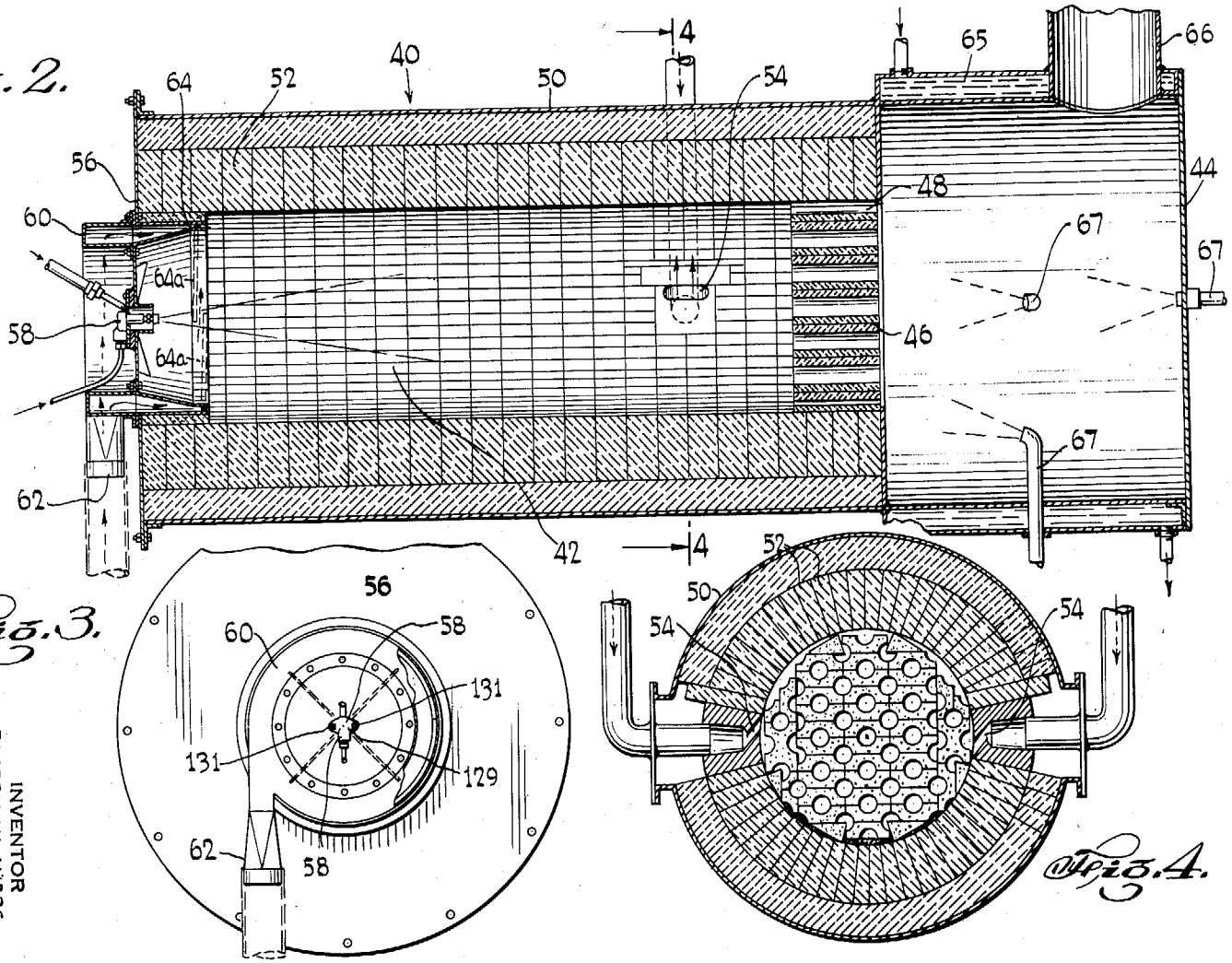
Figure 2 is a more detailed showing of one form of furnace or retort in which the combustion and cracking reactions take place.
Figure 3 is an end view of one of the retorts.
Figure 4 is a sectional view through one of the retorts on the line 4—4 of Figure 2 and showing the auxiliary air inlets and the refractory checkerwork constituting the end wall.

In this form of embodiment the retort 40a is constructed substantially as illustrated in Figure 2, except that the auxiliary air inlets 54 may be omitted if desired. The forward end of the retort is filled with a modified form of an inlet head 60a in which the air is introduced toward the outside of a drum-like casing 140 through an annular header 141 under a substantially higher pressure than described above and flows toward the center of the head 60a where it enters the retort chamber 42a through the opening 142 around the injector nozzle 58a.

The opening 142 is formed with a flared outlet 143 and the oil injector nozzle 58a is made adjustable in three positions and is provided with an enlargement 144, which cooperates with the flanged outlet 143 from the casing 140 to adjust the direction of the air stream into the retort and the place of impingement of the air stream A on the oil stream P. The enlargement 144 on the nozzzle 58a is provided with a cylindrical central portion 144a, a forwardly sloping conical portion 144b and a rearwardly sloping conical portion 144c, so that when the nozzle 58a is adjusted to its rearward position in the stuffing box 145, as illustrated in Figure 12, the forwardly sloping conical portion 144b is opposite the flared outlet 143 for the air and the air stream is directed in an inwardly sloping conical path $a^1$ to impinge on the oil stream P at a point near the outlet from the nozzle 58a. When the nozzle 58a is in the middle or full line position illustrated in Figure 13, the air stream is directed in a substantially parallel path $a^2$, indicated by dash lines, to impinge on the oil stream P at a point further removed from the end of the nozzle 58a, and when the nozzle 58a is in the forward position illustrated in dash lines in Figure 13, the air stream is directed in an outwardly flaring cone $a^3$ to impinge on the oil stream still farther away from the end of the nozzle 58a.

In each of the three positions of the nozzle 58a, the place and the direction at which the air stream strikes the oil stream is varied, which brings about a difference in the period of contact of the oil and air, and a difference in the currents set up due to the intensity and direction at which the air strikes the oil. By varying the position of the nozzle 58a, different conditions are created by which the quality of the carbon black produced may be changed. In order to reduce eddy current in the retort, the corners adjacent the air header may be filled with refractory material 146.

It will be understood that the particular practices mentioned above are described by way of illustration and not as limitations. For example, I have prepared a liquid hydrocarbon raw material by adding about 30% of petroleum distillate to a Casmalia crude from which base settlings and water have been removed and have obtained a black of very high quality by spraying this material into a cracking retort under atomizing pressures of between 2000 and 3500 pounds per square inch, without preliminary heating. It is also possible to use distillates or any other oil in my process, and it may be generally stated that the lower the gravity of the oil used, the higher the pressure at the nozzles to effect suitably fine atomization and vaporization of the oil particles to break them down into a sufficiently minute state of subdivision to insure that each particle will be properly combusted or cracked in the short time it is in the reaction zone. A large variety of liquid hydrocarbon raw materials may be used in the process, and considerable variation in atomizing pressures may be resorted to, depending upon the physical characteristics of particular raw materials.

I have found that it is extremely important that each oil particle be broken down into a sufficiently minute state of sub-division and that it be combusted to the desired degree of partial combustion before any particle of liquid oil reaches the walls or the checkerwork end of the retort. Where the degree of atomization is not sufficient to vaporize or break the oil particles sufficiently small that each can be burned before reaching the walls or end of the retort, these unburned or liquid particles of oil begin to build up and burn on the walls or in the checkerwork of the retort and start the formation of carbon deposits which cling to the walls and quickly build up to the point where they will choke the retort necessitating dismantling the same and removal of the carbon deposits. Where, however, the proper degree of atomization is obtained, and a uniform spray pattern and other conditions maintained which prevent unburned or liquid oil particles reaching the side walls or checkerwork of the retort, it is possible to operate my process for months, or, in other words, continuously, without the necessity for stoppage due to carbonization or choking up of the retorts.

For this reason, it is not only necessary to have a high degree of atomization or fine sub-division of the oil particles but a uniform distribution of these particles in the oil spray pattern, and, as will be described later, if the tip of the atomizing nozzle becomes worn or out of true because of wear due to the high pressure at which the oil is projected therethrough, it becomes necessary to replace this defective tip with one which produces a uniform spray pattern as well as a high degree of atomization, because if too many of the oil particles are thrown to one side of the reaction zone, they cannot all be burned on this side of the zone in the short time they have to travel from the end of the nozzle toward the walls of the retort and hence some unburned or liquid oil particles will reach the sides of the retort and start the coking or choking up of the retort. An ununiform spray pattern will also produce a poor quality carbon.

In another way of practicing my invention, such as illustrated for example in Figures 12 and 13, I may introduce the air into the reaction chamber under pressures greatly in excess of that mentioned specifically above. This has the advantage of increasing the air velocity to a point more closely approximating the velocity of the atomized oil, which improves the distribution of oil and air in the reaction chamber and with the adjustable injector nozzle 58*a* permits greater freedom in regulating the process. It also permits an increase in the density of gases within the chamber and increases the percentage of oxygen and the shearing or breaking up action between the oil particles and the gases in the reaction zone, thus improving the efficiency of the process and the quality of the product.

Figures 5, 6:
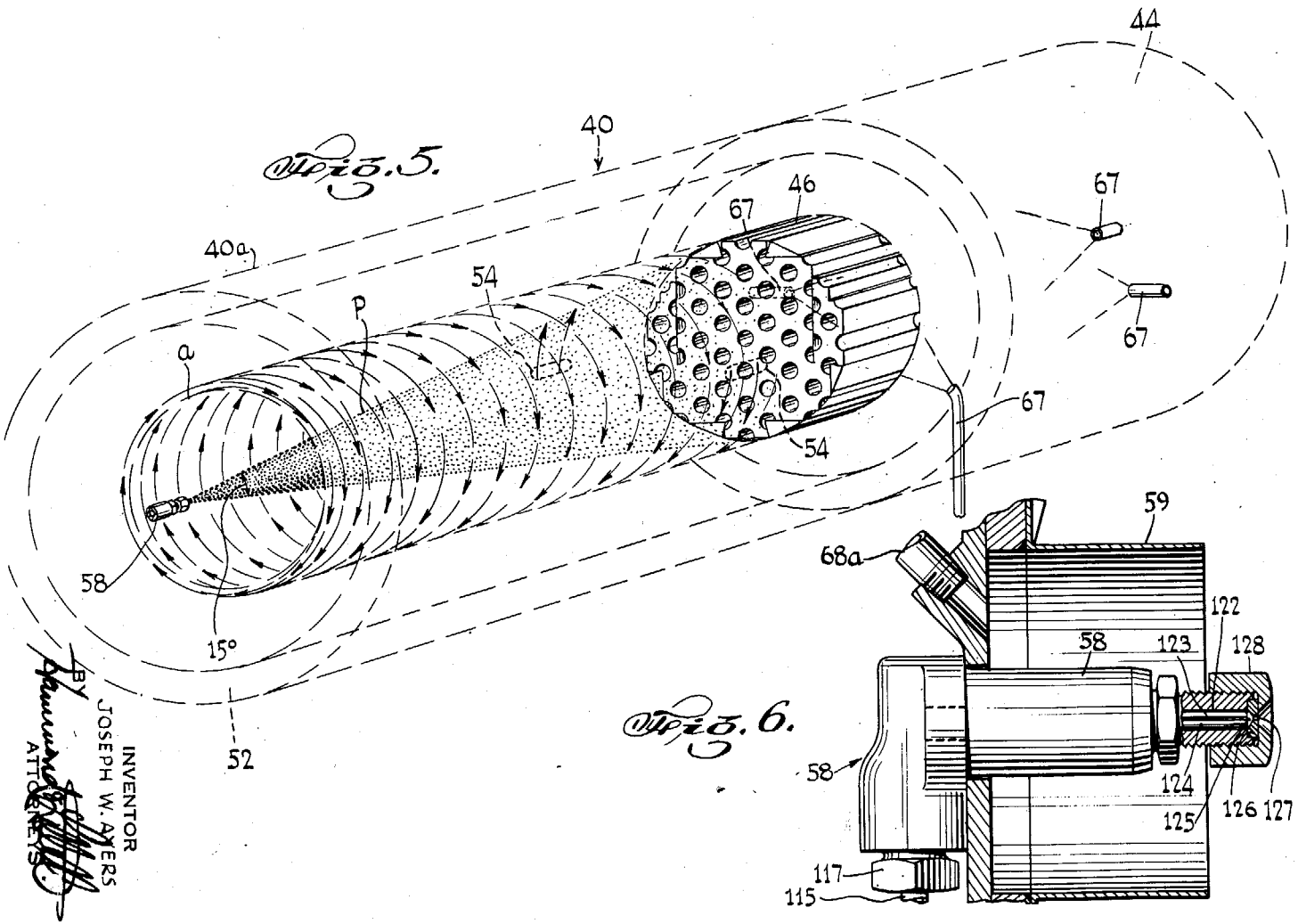
Figure 5 is a diagrammatic perspective illustrating the combustion conditions in one of the retorts.
Figure 6 is a detail view illustrating one form of injector nozzle for injecting the oil under high pressure into the retorts.
Figure 7:
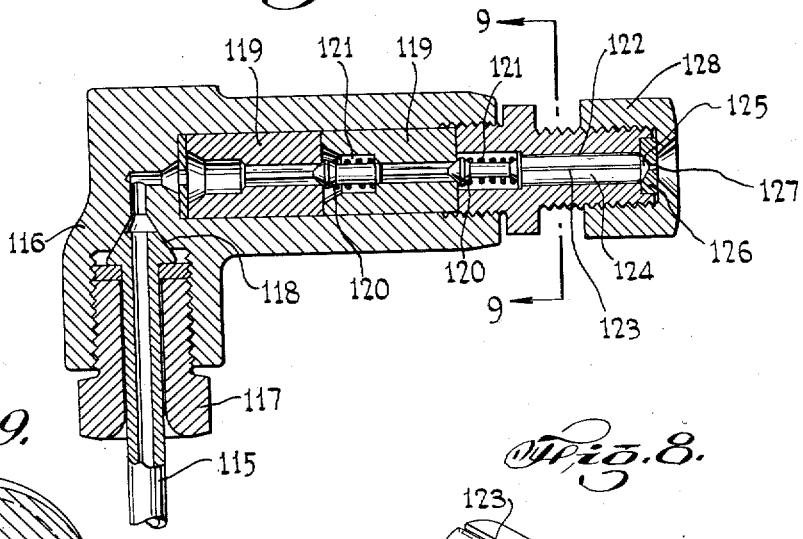
Figure 7 is a detail sectional view of one form of injector nozzle.
Figure 9:
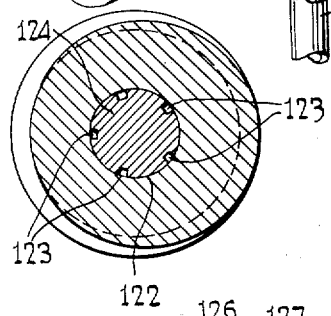
Figure 9 is a sectional view on the line 9—9 of Figure 7 showing the vane member in position in the nozzle.
Figure 8:
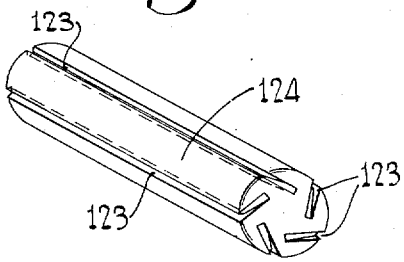
Figure 8 is a detail perspective view of one of the vane members for breaking the oil particles into a fine spray.
Figure 10:
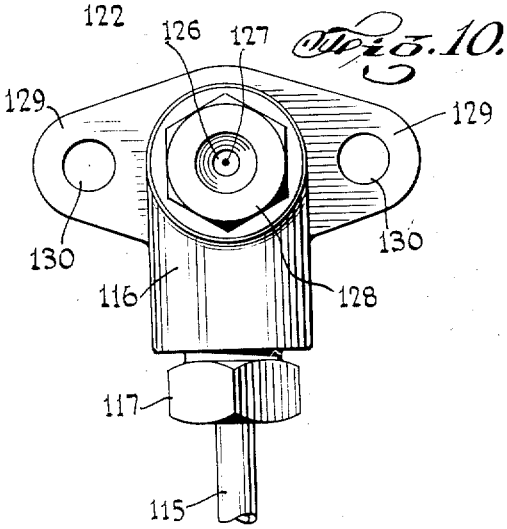
Figure 10 is an end view of the nozzle.
Figure 11:
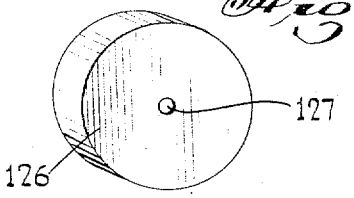
Figure 11 is a perspective view of one of the replacable refractory nozzle tips for maintaining a uniform spray pattern for the oil.

As I have attempted to illustrate graphically in Figure 5, the oil spray from the nozzle 58 takes a cone shaped pattern P, in which the liquid and vaporized oil particles are indicated as dots of greatly exaggerated size, traveling from the nozzle 58 toward the checkerwork 46 at the end of the reaction zone. The angle of the spray from the end of the nozzle 58 is preferably about 15° and the direction of the air, indicated by the swirling lines A, brought about by its introduction in a swirling manner at the inlet 64 and by the direction of the auxiliary air inlet nozzles 54 is to cause a spiral swirling of the air around to pattern P of the cone of oil particles to insure uniform combustion thereof before any unburned or liquid particles of oil have reached the walls or checkerwork of the reaction zone.

In order to retard the speed of the oil particles as they approach the checkerwork end wall of the reaction zone, and to prevent unburned or liquid oil particles from impinging upon this hot checkerwork where they would form hard particles of carbon and begin to choke the retort, I introduce sufficient steam through the nozzle 67 and under sufficient pressure into the cooling chamber 44 to create a back pressure of approximately seven pounds per square inch adjacent the checkerwork end of the reaction zone. This is sufficient to retard the speed at which any unburned oil particles approach the checkerwork and to insure that any such unburned oil particles will be retarded and burned before reaching the checkerwork, but at the same time it is not sufficient to stop the flow of the combustion gases and carbon particles through the checkerwork and into the cooling chamber 46 where they encounter more steam and are cooled below the zone of further reaction before being discharged through the conduit 66.

By properly balancing the pressures of the air, the oil injection and the steam, it is possible to keep the oil particles in the reaction zone long enough to burn them to the desired degree of incomplete combustion to break down the hydrocarbons to form a very good form of amorphous carbon with a high yield and still remove or sweep the carbon particles out of the reaction zone before undesired secondary reactions take place. At the same time, the process may be operated continuously without coking or choking of the retorts and without shutting down to remove the formed carbon as with the prior lamp black processes.

As illustrated in Figures 2 and 6, the oil nozzle 58 is shielded by a surrounding collar 59 and an additional air inlet 68*a* supplies air adjacent the burner tip to keep the burner tip cool. In Figures 12 and 13 the burner tip is cooled by the passage of air through the orifice 142.

In order to have fine atomization of the oil particles, a special oil nozzle with a replaceable tip is used, to permit replacement of the tip when it becomes so worn or distorted as to throw a nonuniform spray pattern. While the oil nozzle may be constructed in various forms to atomize the heavy oil at high pressures, a particularly suitable oil nozzle is illustrated in Figures 6 to 11, inclusive.

In the form of oil nozzle here illustrated, the oil enters the nozzle through the conduit 115 which is adapted to carry oil under a high pressure, and is firmly secured in the nozzle holder 116 by a threaded collar 117 which forces the flanged and beveled end of the conduit 115 firmly against a seat 118 in the holder 116. From the end of the conduit 115, the oil flows through an opening in the holder 116 and through the openings in the removable valve seats 119 and past the check valves 120, which are kept seated by the springs 121, to the whirler chamber 122, where it flows through slots 123 in a whirler 124 to the forward end thereof, where each slot 123 terminates in a radially directed passage which discharges the oil with a circular motion or whirl into the cone shaped passage 125 in a replaceable insert 126 at the end of the whirler chamber 122. At the forward end of the whirler chamber 122 the replaceable insert 126, provided with a passage 127 and conical opening 125, is held in place by a threaded hexagonal collar 128 so that the insert 126 may be readily removed and replaced if, due to the passage of oil under high pressure therethrough, the passage 127 should become worn so as no longer to provide a uniform spray pattern for the oil discharged from the nozzle 58. The entrance 125 into the passage 127 in the insert 126 is counter-sunk to provide a cone shaped passage by which the angle of the oil spray P is controlled. It is important that the outlet end of the passage 127 be such as to provide a uniform spray pattern for the oil entering the retort.

The nozzle 58, as illustrated in Figures 6 to 11, is provided with wing extensions 129, having openings 130 therethrough, by which the nozzle may be removably secured to the end wall of the retort by means of stud bolts 131 to permit easy removal. In Figures 12 and 13 the nozzle 58a is adjustably mounted in a stuffing box 145.

While other forms of nozzles capable of atomizing oil into a uniform spray pattern at high pressures may be used, I have found the nozzles described above to be suitable for this purpose.

The removable insert tip 126 is preferably made of hardened steel or other hard alloys, either ferrous or non-ferrous, to resist abrasion of the oil particles discharged therethrough under high pressure and to resist deformation at high temperature. Operating at a pressure of 4000 to 6000 pounds per square inch on heavy asphaltic crude, I have found that hardened steel inserts 126 will give a uniform spray pattern for about three weeks continuous operation before becoming so worn as to throw the spray pattern out of round.

In starting operation of the retort 40, it is preferable to preheat it to a temperature in excess of 1000° F. using sufficient air to provide complete combustion of the materials burned in the retort before starting the high pressure oil and air streams. This may be done in many ways, either by the use of a special oil burner preheater or by stoking the retort with wood and igniting and blowing air therethrough to secure the desired preheat temperature. In order to prevent the products of combustion from the preheating operation from passing through the precipitator, cyclone, etc., and possibly contaminating the carbon black later produced, I provide the retort with a stack 66a having a lid or closure 66b which can be opened to permit the products of combustion to escape during the preheating operation but which can be closed and sealed down during regular operation.

The process herein described produces a new type of lampblack having qualities greatly superior to other lampblack heretofore known in the art and in several respects superior to channel black. This lampblack produced by the present process is remarkably free of adsorbed organic polymer materials, as shown by acetone or benzene extraction tests. Its oil absorption capacity is only about 50% of that of other blacks on the market. It is notable for its high tinting strength in paints, varnishes and the like, and its uniform high color tone, which is characterized by an unusual clear blue tone. The new lampblack also possesses improved pigment qualities for use in rubber compositions. Standard rubber tests comparing it with channel black show that the new material imparts a higher modulus of elasticity, greater abrasion resistance and better flexing qualities to rubber than channel black. The rate of cure of a rubber composition including this material is much higher than in the case of channel black.

Many possible variations in raw materials, pressures, temperatures and methods of operating my process will become apparent to skilled workers in this art upon reading the foregoing description. I therefore desire that the invention be accorded a scope fully protecting its various new features and embodiments and commensurate with its broad departure from the prior art as defined in the appended claims.

I claim:

1. The process of producing finely divided carbon which comprises forcing a stream of liquid hydrocarbon through a spray nozzle under pressure of several thousand pounds per square inch, vaporizing, combusting a part of and cracking to elemental carbon a substantial part of the resulting highly atomized spray in a hot heat-insulated reaction zone and discharging the reaction products from said zone and recovering the carbon therefrom.

2. The process of producing finely divided carbon which comprises converting a stream of liquid hydrocarbons into a highly atomized spray by forcing it through a spray nozzle under pressure in excess of 1500 pounds per square inch, vaporizing, combusting a part of and cracking to elemental carbon another part of the atomized spray at a high temperature in a heat-insulated reaction zone of a furnace, and discharging the reaction products from said zone and recovering carbon therefrom.

3. The process of producing finely divided carbon which comprises forcing a stream of liquid hydrocarbons through a spray nozzle under pressure in excess of 1500 pounds per square inch and introducing the resulting highly atomized spray into a heat-insulated reaction zone of a furnace, simultaneously flowing gas to support partial combustion of said spray into said zone, vaporizing, combusting only a part of and cracking the remainder of the hydrocarbons in said zone, discharging gases and suspended carbon from said zone and immediately reducing the same to a non-reactive temperature and separating carbon from said gases.

4. The process of producing finely divided carbon which comprises forcing a stream of liquid hydrocarbons through a spray nozzle under pressure in excess of 1500 pounds per square inch, and directing the resulting highly atomized spray into a reaction zone embraced by heat-insulating walls, simultaneously flowing air under pressure into said zone to support partial combustion of said spray, vaporizing, combusting a part of and cracking to elemental carbon a substantial part of the hydrocarbons in the reaction zone, discharging gases and suspended carbon from said zone through a perforate wall at the end of the same and into a cooling zone, and maintaining an inert gaseous fluid under superatmospheric pressure in said cooling zone.

5. The process of producing finely divided carbon which comprises preparing a fluent hydrocarbon liquid consisting principally of crude petroleum, forcing a stream of the liquid through a spray nozzle under pressure of several thousand pounds per square inch, vaporizing, combusting a portion of and cracking to elemental carbon a substantial portion of the resulting highly atomized spray in a heat-insulated reaction zone while maintaining said zone at hydrocarbon cracking temperatures by the heat of such combustion, and discharging the reaction products from said zone and recovering carbon therefrom.

6. The process of producing finely divided carbon which comprises heating a heavy asphalt base petroleum to render it fluent, forcing a stream of the material through a spray nozzle under pressure of several thousand pounds per square inch, and vaporizing, combusting a portion of and cracking to elemental carbon a substantial portion of the resulting highly atomized spray in a heat-insulated reaction zone of a furnace and discharging the reaction products from said zone and recovering carbon therefrom.

7. The process of producing finely divided carbon which comprises heating a heavy asphalt base petroleum to render it fluent, continuously forcing a stream of the heated material through a spray nozzle under pressure in excess of 1500 lbs. per square inch and thence into a heat insulated reaction zone of a furnace, combusting in part and cracking the resulting highly atomized spray of the material in the heat-insulated reaction zone of the furnace, quickly reducing resulting gases and suspended carbon to a non-reactive temperature, electrostatically flocculating particles of the carbon while the gases and carbon remain hot and continuously separating and collecting the carbon.

8. The process of producing finely divided carbon which comprises continuously forcing a stream of liquid hydrocarbons through a spray nozzle under pressure of several thousand pounds per square inch and introducing the resulting, highly atomized hydrocarbons into a heat-insulated reaction zone and vaporizing, combusting a portion of and cracking to elemental carbon a substantial portion of the hydrocarbons in said zone, continuously discharging reaction gases and suspended carbon from said zone while maintaining said zone under superatmospheric pressure, and separating the carbon from said gases.

9. The process of producing finely divided carbon which comprises continuously forcing a stream of liquid hydrocarbons through an atomizing spray nozzle under high pressure sufficient to disintegrate the liquid into minute particles, the extent of such disintegration being at least equivalent to that obtained by forcing crude oil of 9–10 A. P. I. gravity, heated to 150° F., through such a nozzle under pressure of 2,000 pounds per square inch, vaporizing, combusting a portion of and cracking to elemental carbon a substantial portion of the resulting highly atomized spray in a heat-insulated reaction zone of a furnace, continuously discharging resulting gases and suspended carbon from said zone and separating the carbon, and maintaining said zone at a substantially uniform temperature of at least 2000° F.

10. The process of producing finely divided carbon which comprises continuously forcing a stream of liquid hydrocarbons through an atomizing spray nozzle under high pressure sufficient to disintegrate the liquid into minute particles, the extent of such disintegration being at least equivalent to that obtained by forcing crude oil of 9–10 A. P. I. gravity, heated to 150° F., through such a nozzle under pressure of 2,000 pounds per square inch, vaporizing, combusting a portion of and cracking to elemental carbon a substantial portion of the resulting highly atomized spray in a heat-insulated reaction zone of a furnace, continuously discharging resulting gases and suspended carbon from said zone and quickly reducing the same to a non-reactive temperature, flocculating particles of the carbon while still hot, separating carbon from said gases and collecting the separated carbon.

11. The process of producing finely divided carbon which comprises continuously forcing a stream of liquid hydrocarbon through an atomizing spray nozzle under high pressure sufficient to disintegrate the liquid into minute particles, the extent of such disintegration being at least equivalent to that obtained by forcing crude oil of 9–10 A. P. I. gravity, heated to 150° F., through such a nozzle under pressure of 2,000 pounds per square inch, vaporizing, combusting a portion of and cracking to elemental carbon a substantial portion of the resulting highly atomized spray in a heat-insulated reaction zone of a furnace, continuously discharging resulting gases and suspended carbon from said zone into a cooling zone and quickly reducing the same to a non-reactive temperature, continuously flocculating particles of the carbon while still hot, continuously separating carbon from said gases and collecting the separated carbon.

12. The process of producing finely divided carbon which comprises continuously forcing a stream of liquid hydrocarbon through an atomizing spray nozzle under high pressure sufficient to disintegrate the liquid into minute particles, the extent of such disintegration being at least equivalent to that obtained by forcing crude oil of 9–10 A. P. I. gravity, heated to 150° F., through such a nozzle under pressure of 2,000 pounds per square inch. vaporizing, combusting a portion of and cracking to elemental carbon a substantial portion of the resulting highly atomized spray in a heat-insulated reaction zone of a furnace, continuously discharging resulting gases and suspended carbon from said zone into a cooling zone and quickly reducing the same to a non-reactive temperature, continuously flocculating particles of the carbon while still hot, continuously separating carbon from said gases and collecting the carbon, and maintaining the system under positive pressure during all of the aforesaid operations.

13. The process of producing finely divided carbon which comprises continuously forcing a stream of liquid hydrocarbon through an atomizing spray nozzle under high pressure sufficient to disintegrate the liquid into minute particles, the extent of such disintegration being at least equivalent to that obtained by forcing crude oil of 9–10 A. P. I. gravity, heated to 150° F., through such a nozzle under pressure of 2,000 pounds per square inch, vaporizing, combusting a portion of and cracking to elemental carbon a substantial portion of the resulting highly atomized spray in a heat-insulated reaction zone of a furnace, continuously discharging resulting gases and suspended carbon from said zone into a cooling zone and quickly reducing the same to a non-reactive temperature, continuously separating carbon from said gases and collecting the carbon, and maintaining the system under positive pressure during all of the aforesaid operations.

14. In the process recited in claim 13, further cooling the collected carbon out of contact with air to avoid spontaneous combustion and thereafter drying the same.

15. The process of producing finely divided carbon which comprises heating a heavy asphalt base petroleum to a temperature between 150° and 500° F. to render it fluent, forcing a stream thereof through a spray nozzle under pressure of between 2000 and 6000 pounds per square inch, and introducing the resulting highly atomized spray into a heat-insulated reaction zone of a furnace, simultaneously flowing air under superatmospheric pressure into said zone, vaporizing, combusting a portion of and cracking to elemental carbon a substantial portion of said spray at high temperatures within said zone, discharging gases and suspended carbon from said zone through a perforate wall adjacent the same and into a cooling zone and maintaining an atmosphere of steam under superatmospheric pressure in said cooling zone.

16. The process of producing finely divided carbon which comprises heating a heavy asphalt base petroleum to a temperature between 150° and 500° F. to render it fluent, forcing a stream thereof through a spray nozzle under pressure of between 2000 and 6000 pounds per square inch, and introducing the resulting highly atomized spray into a heat-insulated reaction zone of a furnace maintained at a temperature in excess of 2000° F., simultaneously flowing air under superatmospheric pressure into said zone, vaporizing, combusting a portion of and cracking to elemental carbon a substantial portion of said spray at high temperatures within said zone, discharging gases and suspended carbon from said zone through a perforate wall adjacent the same and into a cooling zone and maintaining an atmosphere of steam under superatmospheric pressure in said cooling zone.

17. The process of producing finely divided carbon which comprises heating a heavy asphalt base petroleum to a temperature between 150° and 500° F. to render it fluent, forcing a stream thereof through a spray nozzle under pressure of between 2000 and 6000 pounds per square inch, and introducing the resulting highly atomized spray into a heat-insulated reaction zone of a furnace, simultaneously flowing air under superatmospheric pressure into said zone, vaporizing, combusting a portion of and cracking to elemental carbon a substantial portion of said spray at high temperatures within said zone, discharging gases and suspended carbon from said zone through a perforate wall adjacent the same and into a cooling zone, maintaining an atmosphere of steam under superatmospheric pressure in said cooling zone, passing the gases and carbon from said cooling zone, thereafter continuously flocculating particles of the carbon while still hot and then separating the same from the gases.

18. The method of producing lampblack substantially free of adsorbed organic polymer compounds and having a lower oil adsorption and bluer color tone than channel black, from liquid hydrocarbon oil, which comprises continuously forcing a stream of liquid hydrocarbon through an atomizing spray nozzle under high pressure sufficient to disintegrate the liquid into minute particles, the extent of such disintegration being at least equivalent to that obtained by forcing crude oil of 9–10 A. P. I. gravity, heated to 150° F., through such a nozzle under pressure of 2,000 pounds per square inch, vaporizing, combusting a portion of and cracking to elemental carbon a substantial portion of the resulting highly atomized spray of liquid hydrocarbon in a heat-insulated reaction zone maintained at a temperature of at least 2300° F. and under superatmospheric pressure, discharging the resulting gases and suspended carbon into an inert cooling atmosphere within a tenth of a second after the formation thereof, and thereafter separating carbon from said gases.

19. In a process of producing finely divided carbon from liquid hydrocarbons, the steps which comprise forcing the liquid through an atomizing spray nozzle under pressure in excess of 1500 pounds per square inch and directing the resulting highly atomized spray in a uniform conical pattern into an elongated high temperature reaction chamber having heat-insulating, heat-radiant side walls, forcing air into the chamber in an annular stream surrounding the atomized spray and causing the hydrocarbons and the surrounding air stream to impinge and react inside of and out of contact with the walls of said chamber, regulating the supply of air so that enough of the hydrocarbons is combusted to maintain hydrocarbon cracking temperatures in said chamber while substantially the remainder of the hydrocarbons is cracked therein to elemental carbon, conducting the resulting reaction products from said chamber and thereafter recovering the carbon.

20. In a process of producing finely divided carbon from liquid hydrocarbons, the steps which comprise providing at a high temperature a reaction zone bounded by a cylindrical heat-insulating refractory side wall and by an end wall providing a passageway for reaction products therethrough, forcing the liquid under high pressure through an atomizing spray nozzle disposed coaxially with said side wall and so causing the hydrocarbons to enter said zone as a uniform conical, highly atomized spray which is instantly vaporized by the heat in said zone, forcing air into said zone in an annular stream surrounding the atomized spray so that the hydrocarbons and the surrounding air stream impinge and react inside of said zone out of contact with said side and end walls, regulating the supply of air so that enough of the hydrocarbons is combusted to maintain hydrocarbon cracking temperatures in said zone while substantially the remainder of the hydrocarbons is cracked therein to elemental carbon, and quickly discharging the reaction products including the carbon through said passageway and thereafter recovering the carbon.

21. In a process of producing finely divided carbon from liquid hydrocarbons, the steps which comprise providing at a high temperature a reaction zone bounded by a cylindrical refractory side wall and a perforate refractory end wall, forcing the liquid under high pressure through an atomizing spray nozzle disposed coaxially with said side wall, in which nozzle the liquid is caused to swirl and then to pass through the nozzle orifice and enter said zone as a uniform conical hydrocarbon spray which is immediately vaporized by the heat in said zone, forcing air into said zone in a spirally swirling annular stream surrounding the atomized spray, and causing the atomized spray and the surrounding air stream to impinge and react inside of said zone out of contact with said side and end walls.

22. In a process of producing finely divided carbon from liquid hydrocarbons, the steps which comprise providing at a high temperature a reaction zone bounded by a cylindrical heat-insulating refractory side wall and a heat-insulating refractory end wall having a plurality of passages therethrough, forcing the liquid under high pressure through an atomizing spray nozzle and causing the atomized spray to enter said zone in a conical pattern coaxial with said side wall and having an apex angle of about 15°, forcing air into said zone in an annular stream surrounding the atomized spray and causing the atomized spray and the surrounding air stream to impinge and react inside of said zone near to but out of contact with said side and end walls so proportioning the supplies of air and hydrocarbons that enough of the latter is burned to maintain hydrocarbon cracking temperatures in said zone while a substantial portion of the hydrocarbons is cracked therein to elemental carbon, and discharging the reaction products including the carbon from said zone through said passages and thereafter recovering the carbon.

23. In a process of producing finely divided carbon from liquid hydrocarbons, the steps which comprise providing at a high temperature a reaction zone bounded by a cylindrical heat-insulating refractory side wall and a heat-insulating refractory end wall having a plurality of passages therethrough, forcing the liquid under high pressure through an atomizing spray nozzle and directing the resulting atomized spray into said zone in a conical spray pattern coaxial with said side walls, forcing air into said zone in an annular stream surrounding the atomized spray, maintaining an atmosphere of steam under superatmospheric pressure beyond said perforate end wall to exert a back pressure at the end of said zone, causing the atomized spray and the surrounding air stream to impinge and react inside of said zone out of contact with said side and end walls, so proportioning the supplies of air and hydrocarbons that enough of the latter is burned to maintain hydrocarbon cracking temperatures in said zone while a substantial portion of the hydrocarbons is cracked therein to elemental carbon, and quickly discharging the reaction products including the carbon through said passages into said steam and thereafter recovering the carbon.

24. The process of producing finely divided carbon which comprises forcing a stream of liquid hydrocarbon through a spray nozzle under high pressure sufficient to disintegrate the liquid into minute particles of almost molecular dimensions, the extent of such disintegration being at least equivalent to that obtained by forcing crude oil of 9–10 A. P. I. gravity, heated to 150° F., through such a nozzle under pressure of 2,000 pounds per square inch, directing the resulting highly atomized spray into a high temperature reaction zone while supplying thereinto oxygen-containing gas at a rate sufficient only to support partial combustion of said spray, substantially instantaneously vaporizing, combusting a portion of and cracking to elemental carbon a substantial portion of said particles in said zone and discharging the reaction products from said zone and recovering carbon therefrom.

25. The process of producing finely divided carbon which comprises vaporizing, combusting a portion of and cracking to elemental carbon a substantial portion of a highly atomized spray of liquid hydrocarbon at high reaction temperatures in a heat-insulated reaction zone of a furnace, forcing an inert gaseous cooling medium into a cooling zone beyond and communicating with said reaction zone so as to maintain such medium under superatmospheric pressure in said cooling zone, maintaining the substances in said reaction zone at superatmospheric pressure sufficient to discharge the carbon and gases produced by the reaction therein into said cooling zone within a tenth of a second after the formation thereof and conducting the carbon and gases from said cooling zone and recovering the carbon.

26. In a process of producing finely divided carbon from liquid hydrocarbons, the steps which comprise providing at a high temperature an elongated reaction zone surrounded by a heat-insulating refractory wall, providing in said zone an axial stream of vaporized liquid hydrocarbons, forcing air into said zone so as to maintain therein a spirally swirling air stream, surrounding the hydrocarbon stream, with which the hydrocarbons impinge and react inside of said zone out of contact with said wall, so proportioning the supplies of air and hydrocarbons that enough of the latter is burned to maintain hydrocarbon cracking temperatures in said zone while substantially the remainder of the hydrocarbons is cracked therein to elemental carbon, conducting the resulting reaction products from said zone, and thereafter recovering the carbon from said products.

27. In a process of producing finely divided carbon, the steps which comprise providing at a high temperature an elongated reaction zone surrounded by a heat-insulating refractory wall, providing in said zone an axial stream of gaseous hydrocarbons, forcing air into said zone so as to maintain therein a spirally swirling air stream, surrounding the hydrocarbon stream, with which the hydrocarbons mingle and react inside of said zone so proportioning the supplies of air and hydrocarbons that enough af the latter is burned to maintain hydrocarbon cracking temperatures in said zone while substantially the remainder of the hydrocarbons is cracked therein to elemental carbon, and quickly discharging the reaction products from said zone into a cooling zone therebeyond and there cooling the reaction products to a non-reactive temperature, and thereafter recovering the carbon from said products.

28. In a process of producing finely divided carbon, the steps which comprise providing at a high temperature a reaction zone bounded by a cylindrical heat-insulating refractory wall, providing in said zone a continuous axial stream of hydrocarbon vapors, forcing air tangentially into said zone so as to maintain therein a spirally moving annular air stream, surrounding the hydrocarbon stream, with which the hydrocarbon stream impinges and reacts inside of said zone out of contact with said wall, so proportioning the supplies of air and hydrocarbons that enough of the latter is burned to maintain hydrocarbon cracking temperatures in said zone while substantially the remainder of the hydrocarbons is cracked therein to elemental carbon, conducting the resulting reaction products from said zone, and thereafter recovering the carbon from said products.

29. In a process of producing finely divided carbon from liquid hydrocarbons, the steps which comprise providing at a high temperature a reaction zone bounded by a cylindrical heat-insulating refractory wall, providing axially in said zone a continuous stream of vaporized liquid hydrocarbons, forcing air into said zone in a plurality of tangential streams so as to maintain a spirally moving annular air stream adjacent said wall between the same and said hydrocarbon stream, so that the hydrocarbon stream and the annular air stream impinge and react in a swirling condition in said zone, so proportioning the supplies of air and hydrocarbons that enough of the latter is burned to maintain hydrocarbon cracking temperatures in said zone while substantially the remainder of the hydrocarbons is cracked therein to elemental carbon, conducting the resulting reaction products from said zone, and thereafter recovering the carbon from said products.

30. In a process of producing finely divided carbon from liquid hydrocarbons, the steps which comprise providing at hydrocarbon cracking temperatures a reaction zone bounded by a cylindrical heat-insulating wall, forcing liquid hydrocarbons through an atomizing spray nozzle disposed coaxially with said wall so as to supply into said zone a uniform conical spray of atomized hydrocarbons that is immediately converted into an axial stream of vaporized hydrocarbons by the heat within said zone, forcing air into said zone so as to maintain therein a spirally moving annular air stream, surrounding the hydrocarbon stream, with which the hydrocarbon stream impinges and reacts inside of said zone out of contact with said wall, and so proportioning the supplies of air and hydrocarbons that enough of the latter is burned to maintain hydrocarbon cracking temperatures in said zone while a substantial portion of the hydrocarbons is cracked therein to elemental carbon.

31. In a process of producing finely divided carbon from liquid hydrocarbon, the steps which comprise providing at hydrocarbon cracking temperatures a reaction zone bounded by a cylindrical refractory side wall, forcing liquid hydrocarbons through an atomizing spray nozzle disposed coaxially with said wall so as to supply into said zone a uniform conical spray of atomized hydrocarbons that is immediately converted into an axial stream of vaporized hydrocarbons by the heat within said zone, forcing air into said zone so as to maintain therein a spirally moving annular air stream surrounding the hydrocarbon stream, so that the hydrocarbon stream and the surrounding air stream impinge and react inside of said zone out of contact with said side wall, the quantities of air and hydrocarbon being so proportioned as to combust only a part of the hydrocarbons, to crack the remainder to a form of elemental carbon and to maintain the desired cracking temperature in said zone by the heat of the combustion.

32. A process for producing finely divided carbon which comprises providing at hydrocarbon cracking temperatures a reaction zone bounded by a cylindrical heat-insulating refractory wall, introducing air into said zone substantially tangent to the inner periphery of said wall so as to maintain adjacent thereto a spirally moving annular air stream, providing in said zone, inside and axially with respect to said annular air stream, a stream of hydrocarbons in a gaseous state, so that the respective streams mingle and react within said zone, regulating the quantities of air and hydrocarbons in the respective streams so that enough of the hydrocarbons is burned in said zone to maintain desired hydrocarbon cracking temperatures therein while substantially the remainder of the hydrocarbons is cracked therein to elemental carbon, cooling to a non-reactive temperature the reaction products containing gases and suspended carbon, and thereafter recovering the carbon.

33. A process for producing finely divided carbon from hydrocarbons, which comprises introducing the hydrocarbons into one end of an elongated cylindrical reaction zone so as to maintain therewithin a longitudinal stream of the hydrocarbons in a gaseous state, introducing air into said zone at a plurality of spaced ports in the walls of said zone, each port arranged to discharge an air stream circumferentially of the said zone, so that the hydrocarbon stream and the air streams mingle and react, regulating the amount of air supplied to the said zone to provide for combustion of a sufficient portion of the hydrocarbons to generate temperatures within said zone sufficient to decompose the unburned portions of the hydrocarbons, cooling the gaseous products of the combustion and decomposition, and thereafter separating the produced carbon from said gaseous products.

34. A process for producing carbon black from a hydrocarbon gas in an elongated cylindrical chamber, which comprises providing a stream of the hydrocarbon gas in a reaction zone within said chamber, introducing air into said chamber at a plurality of spaced ports in the side walls of said chamber, each port arranged to discharge an air stream circumferentially of the said chamber, admixing the hydrocarbon gas in said air streams, regulating the amount of air supplied to the said chamber to provide for combustion of a portion of the hydrocarbon gas to generate sufficient temperatures within said chamber to decompose the unburned portions of the gas, cooling the gaseous products of the combustion and decomposition, and thereafter separating the produced carbon black from said gaseous products.

JOSEPH W. AYERS.

REFERENCES CITED

The following references are of record in the file of this patent:

UNITED STATES PATENTS

| Number | Name | Date |
|---|---|---|
| 1,438,032 | Frost | Dec. 5, 1922 |
| 1,807,321 | Miller | May 26, 1931 |
| 2,000,580 | Carruthers | May 7, 1935 |
| 2,104,311 | Russell | Jan. 4, 1938 |
| 1,618,808 | Burg | Feb. 27, 1927 |
| 1,656,907 | Bausen | Jan. 24, 1938 |
| 2,153,951 | Barber | April 11, 1939 |